(12) United States Patent
Marti (10) Patent No.: US 12,539,643 B2
(45) Date of Patent: Feb. 3, 2026

(54) THREE-DIMENSIONAL PRINTING HEAD FOR PRINTING A THREE-DIMENSIONAL STRUCTURE

(71) Applicant: VICAT, L'Isle-d'Abeau (FR)

(72) Inventor: Patrik Marti, Lyss (CH)

(73) Assignee: VICAT, L'Isle-d'Abeau (FR)

( * ) Notice: Subject to any disclaimer, the term of this patent is extended or adjusted under 35 U.S.C. 154(b) by 199 days.

(21) Appl. No.: 18/290,899

(22) PCT Filed: Jul. 8, 2022

(86) PCT No.: PCT/IB2022/000400
§ 371 (c)(1),
(2) Date: Jan. 22, 2024

(87) PCT Pub. No.: WO2023/002247
PCT Pub. Date: Jan. 26, 2023

(65) Prior Publication Data
US 2024/0351242 A1    Oct. 24, 2024

(30) Foreign Application Priority Data

Jul. 22, 2021  (FR) ..................................... 21/07944

(51) Int. Cl.
*B28B 1/00*     (2006.01)
*B28C 5/12*     (2006.01)
(Continued)

(52) U.S. Cl.
CPC .............. *B28C 5/148* (2013.01); *B28B 1/001* (2013.01); *B28C 5/1238* (2013.01); *B33Y 30/00* (2014.12)

(58) Field of Classification Search
CPC ... B29C 64/106; B29C 64/209; B29C 64/314; B29C 64/336; B28C 5/148;
(Continued)

(56) References Cited

FOREIGN PATENT DOCUMENTS

| CN | 111391063 A | 7/2020 |
| DE | 8505050 U1 * | 5/1987 |
| WO | 9528229 A1 | 10/1995 |

OTHER PUBLICATIONS

International Search Report for International Application No. PCT/IB2022/000400; Mailing Date, Jan. 10, 2023.
(Continued)

*Primary Examiner* — Galen H Hauth
*Assistant Examiner* — Mohamed K Ahmed Ali
(74) *Attorney, Agent, or Firm* — CANTOR COLBURN LLP (57) ABSTRACT

A three-dimensional printing head including a dynamic mixer comprising a mixer casing, which delimits a mixing chamber, a supply inlet configured to supply the mixing chamber with a mineral composition and a discharge outlet; and an injector for injecting a building material admixture in the mixing chamber. The injector includes a tubular injecting member being flexible and having an injection outlet, the tubular injecting member being elastically deformable between a first state in which the tubular injecting member is configured to allow a flow of the building material admixture through the tubular injecting member and towards the injection outlet, and a second state in which the tubular injecting member is configured to prevent a flow of the mineral composition from the mixing chamber and through the tubular injecting member.

19 Claims, 8 Drawing Sheets

(51) Int. Cl.
*B28C 5/14* (2006.01)
*B33Y 30/00* (2015.01)
(58) Field of Classification Search
CPC ......... B28C 5/1238; B28C 7/026; B28C 7/12; B28B 1/001; B33Y 30/00
See application file for complete search history.

(56) References Cited

OTHER PUBLICATIONS

Written Opinion for International Application No. PCT/IB2022/000400; Mailing Date, Jan. 10, 2023.

* cited by examiner

THREE-DIMENSIONAL PRINTING HEAD FOR PRINTING A THREE-DIMENSIONAL STRUCTURE

CROSS REFERENCE TO RELATED APPLICATIONS

This application is a National Stage of PCT Application No. PCT/IB2022/000400 filed on Jul. 8, 2022, which claims priority to French Patent Application No. 21/07944 filed on Jul. 22, 2021, the contents each of which are incorporated herein by reference thereto.

TECHNICAL FIELD

The present disclosure relates to a three-dimensional printing head for printing a three-dimensional structure from a building material, and for example a cementitious building material.

BACKGROUND

As known, a three-dimensional printing head notably comprises:
  a dynamic mixer comprising a mixer casing delimiting a mixing chamber, a supply inlet emerging in the mixing chamber and configured to supply the mixing chamber with a mineral composition, and particularly a cementitious composition, and a discharge outlet emerging in the mixing chamber, and
  an injector configured to be fluidly connected to a building material admixture supply line, the injector being configured to inject a building material admixture, for example a concrete admixture, in the mixing chamber, the dynamic mixer being configured to mix the cementitious composition and the building material admixture contained in the mixing chamber in order to produce the building material.

In order to prevent a flow of cementitious composition from the mixing chamber and into the building material admixture supply line, it is known to provide the building material admixture supply line or the injector with a check valve which only allow a fluid flow towards the mixing chamber. However, the presence of such a check valve increases the manufacturing and maintenance costs of the three-dimensional printing head.

To overcome this drawback, it is known to provide the injector with an injection needle including an end portion having an injection outlet emerging in the mixing chamber. Indeed, due to the small flow section of the injection outlet provided on the injection needle, the risks that a flow of cementitious composition flows into the injection needle is significantly reduced. However, using an injection needle to inject the building material admixture into the mixing chamber limits the building material admixture flow rate injected into the mixing chamber, which may harm the physical properties of the produced building material and thus the efficiency of the three-dimensional printing head.

BRIEF SUMMARY

It is an object of the present disclosure to provide an improved three-dimensional printing head which can overcome the drawbacks encountered in conventional three-dimensional printing heads.

Particularly, an object of the present disclosure is to provide a three-dimensional printing head which has a simple structure, while having improved efficiency compared to the conventional three-dimensional printing heads.

According to the present disclosure such a three-dimensional printing head, for printing a three-dimensional structure from a building material such as a cementitious building material, comprises:
  a dynamic mixer comprising a mixer casing delimiting a mixing chamber, the dynamic mixer further comprising a supply inlet emerging in the mixing chamber and configured to supply the mixing chamber with a mineral composition, and a discharge outlet emerging in the mixing chamber,
  an injector for injecting at least one building material admixture, for example a concrete admixture, in the mixing chamber, the dynamic mixer being configured to mix the mineral composition and the at least one building material admixture contained in the mixing chamber in order to produce the building material,
  characterized in that the injector includes a tubular injecting member being flexible and having an injection outlet, the tubular injecting member being elastically deformable between a first state in which the tubular injecting member is configured to allow a flow of the at least one building material admixture through the tubular injecting member and towards the injection outlet, and a second state in which the tubular injecting member is configured to prevent a flow of the at least one building material admixture and/or of the mineral 5 composition from the mixing chamber and through the tubular injecting member.

Such a configuration of the injector allows to prevent a flow of mineral composition from the mixing chamber and into a building material admixture supply line connected to the injector, without using a conventional check valve and while ensuring an important flow rate of building material admixture into the mixing chamber when desired.

Particularly, the tubular injecting member may be formed for example by a flexible hose segment, which reduces the manufacturing and maintenance costs of the three-dimensional printing head.

In the present specification, the term "mineral composition" means any mineral composition which can be used, after adding water, as ink in three-dimensional printing.

The three-dimensional printing head may also include one or more of the following features, taken alone or in combination.

According to an embodiment of the present disclosure, the at least one building material admixture is configured to modify physical properties of the mineral composition, such as its rheology, its surface-active force, its plasticity, its stability, its thixotropy, etc.

According to an embodiment of the present disclosure, the tubular injecting member is configured such that, in the first state, the injection outlet of the tubular injecting member is open, and such that, in the second state, the injection outlet of the tubular injecting member is closed.

According to an embodiment of the present disclosure, the first state of the tubular injecting member corresponds to a rest state of the tubular injecting member.

According to an embodiment of the present disclosure, the tubular injecting member has a frustoconical shape. Advantageously, the tubular injecting member has a cross section which decreases towards the injection outlet.

According to an embodiment of the present disclosure, the tubular injecting member is configured to be elastically deformed in the second state by the mineral composition supplied to the mixing chamber and flowing through the tubular supply member.

According to an embodiment of the present disclosure, the dynamic mixer includes a tubular supply member secured to the mixer casing and fluidly connected to the supply inlet, the tubular injecting member extending at least partially within the tubular supply member. Such an arrangement of the tubular injecting member allows to directly inject the at least one building material admixture in the inflow of the mineral composition. In addition, using a tubular injecting member which is flexible and extends at least partially within the tubular supply member ensures that the injector is movable in the flow of mineral composition. This movement of the injector prevents caking or sticking of the building material at the injection outlet of the activator.

According to an embodiment of the present disclosure, the injection outlet of the tubular injecting member is facing the supply inlet.

According to an embodiment of the present disclosure, the injection outlet of the tubular injecting member emerges in the tubular supply member, for example close to the supply inlet.

According to an embodiment of the present disclosure, the tubular injecting member extends substantially coaxially with the tubular supply member.

According to an embodiment of the present disclosure, the injector includes a mounting sleeve which is secured to the tubular supply member and which includes an axial flow passage fluidly connected to the tubular supply member. The mounting sleeve may extend substantially coaxially with the tubular supply member.

According to an embodiment of the present disclosure, the mounting sleeve is secured to an annular flange of the tubular supply member.

According to an embodiment of the present disclosure, the mounting sleeve includes an inlet opening emerging in an outer peripheral surface of the mounting sleeve, the injector further including a connecting part to which is secured the tubular injecting member, the connecting part being at least partially arranged in the axial flow passage of the mounting sleeve and including a connection channel fluidly connecting the inlet opening to the tubular injecting member.

According to an embodiment of the present disclosure, the connecting part is bent.

According to an embodiment of the present disclosure, the inlet opening extends radially with respect to a central axis of the mounting sleeve.

According to an embodiment of the present disclosure, the connection channel includes a first channel end fluidly connected to the inlet opening and a second channel end extending axially with respect to the central axis of the mounting sleeve.

According to an embodiment of the present disclosure, the injector is configured to inject a mixture of water and of the at least one building material admixture in the mixing chamber.

According to an embodiment of the present disclosure, the injector includes a Y-shaped coupling having an outlet pathway fluidly connected to the inlet opening of the mounting sleeve, and first and second inlet pathways configured to be respectively fluidly connected to a cleaning water source and to at least one building material admixture source.

According to an embodiment of the present disclosure, the three-dimensional printing head includes a tubular connecting member secured to the mounting sleeve and configured to be fluidly connected to a mineral composition source.

According to an embodiment of the present disclosure, the mounting sleeve is interposed, i.e. is sandwiched, between the tubular supply member and the tubular connecting member.

According to an embodiment of the present disclosure, the mixer casing extends along a longitudinal axis which is substantially horizontal.

According to an embodiment of the present disclosure, the dynamic mixer includes a mixing rotor rotatably mounted within the mixing chamber, the mixing rotor extending along an extension axis which is substantially horizontal.

According to an embodiment of the present disclosure, the mixing rotor is removably mounted within the mixer casing.

According to an embodiment of the present disclosure, the mixer casing has a globally cylindrical tubular shape.

According to an embodiment of the present disclosure, the dynamic mixer includes a mixer driving unit configured to drive in rotation the mixing rotor around its extension axis.

According to an embodiment of the present disclosure, the mixing rotor includes a mixing shaft and mixing members distributed along the mixing shaft and extending substantially radially with respect to the extension axis of the mixing rotor.

According to an embodiment of the present disclosure, the mixer casing has a first casing part and a second casing part which delimit the mixing chamber and which are distinct from each other, the first and second casing parts being movably mounted with respect to each other between a closed position in which the first and second casing parts delimit the mixing chamber, and an open position in which the first and second casing parts allow a removal of the mixing rotor out of the mixing chamber. Such a configuration of the mixer casing allows to easily clean the mixing rotor and the inner surface of the mixer casing.

According to an embodiment of the present disclosure, the dynamic mixer includes a blocking device configured to reversibly block the first and second casing parts in the closed position.

According to an embodiment of the present disclosure, the blocking device includes a first attachment member configured to removably attach first end portions of the first and second casing parts with respect to each other and a second attachment member configured to removably attach second end portions of the first and second casing parts with respect to each other.

According to an embodiment of the present disclosure, the mixer casing includes a first open end and a second open end, the dynamic mixer further including a first closing member and a second closing member, such as a first and second closing covers, configured to respectively close the first and second open ends.

According to an embodiment of the present disclosure, each of the first and second casing parts includes mixing elements which extend substantially radially with respect to the extension axis of the mixing rotor.

According to an embodiment of the present disclosure, the first casing part forms a first half casing and the second casing part forms a second half casing.

According to an embodiment of the present disclosure, the at least one building material admixture includes a hardening accelerator.

The term "hardening accelerator" mean any agent conventionally used as an admixture in concrete or mortar compositions in order to accelerate the setting and/or the hardening of a binder and to increase the mechanical performance of the concrete or the mortar. As example of a hardening accelerator, mention may in particular be made of alkaline salts such as sulphates (lithium, sodium, potassium or magnesium sulphate), nitrates (sodium, magnesium, potassium or lithium nitrates), thiocyanates (sodium, magnesium, potassium or lithium thiocyanate), carbonates (sodium, potassium, lithium or magnesium carbonate), hydroxides (sodium or potassium hydroxide), aluminates, silicates and chlorides (sodium, magnesium, potassium or lithium chloride).

According to an embodiment of the present disclosure, the at least one building material admixture includes a setting trigger. The term "setting trigger" means any agent conventionally used to suddenly trigger the setting of a binder and drastically modify its rheology. As an example of a setting trigger, mention may in particular be made of the agents commonly used in shotcrete applications such as so-called "alkaline" accelerators based on sodium or potassium silicate and so-called "non-alkaline" accelerators based on sodium sulphates or aluminum hydroxides.

According to an embodiment of the present disclosure, the three-dimensional printing head further includes an extrusion nozzle which is fluidly connected to the discharge outlet of the dynamic mixer and which is configured to extrude layers of building material on a support surface.

According to an embodiment of the present disclosure, the extrusion nozzle includes a nozzle body provided with an extrusion outlet and being rotatable around a rotation axis which is substantially vertical.

According to an embodiment of the present disclosure, the three-dimensional printing head includes a nozzle driving unit configured to drive in rotation the nozzle body around the rotation axis.

According to an embodiment of the present disclosure, the nozzle driving unit includes a nozzle driving motor and a transmission belt coupled to the driving motor and to the nozzle body.

According to an embodiment of the present disclosure, the extrusion nozzle includes a smoothing device configured to smooth outer surfaces of the extruded layers.

According to an embodiment of the present disclosure, the smoothing device includes a smoothing roller having a central axis and being freely rotatable around its central axis.

According to an embodiment of the present disclosure, the smoothing roller is located close to the extrusion outlet.

According to an embodiment of the present disclosure, the extrusion nozzle further includes:
  a roller support on which is freely rotatably mounted the smoothing roller, the roller support being rotatable with respect to the nozzle body about a support rotation axis which is substantially horizontal and which is substantially perpendicular to the central axis of the smoothing roller, and
  a support driving motor configured to drive in rotation the roller support about the support rotation axis so as to orient the smoothing roller in a selected orientation.

According to an embodiment of the present disclosure, the smoothing roller is displaceable between a smoothing orientation in which the central axis of the smoothing roller is substantially parallel to an outlet orientation of the extrusion outlet, and an inactive orientation in which the central axis of the smoothing roller is inclined relative to the outlet orientation of the extrusion outlet.

According to an embodiment of the present disclosure, the support driving motor is configured to displace the smoothing roller in a vertical displacement plane.

According to an embodiment of the present disclosure, the extrusion nozzle further includes a support member which is secured to the nozzle body and on which is rotatably mounted the roller support.

According to an embodiment of the present disclosure, the smoothing device includes an additional smoothing roller, the smoothing roller and the additional smoothing roller being disposed on either side of the extrusion outlet.

According to an embodiment of the present disclosure, the extrusion nozzle further includes:
  an additional roller support on which is freely rotatably mounted the additional smoothing roller, the additional roller support being rotatable with respect to the nozzle body about a support rotation axis which is substantially horizontal and which is substantially perpendicular to the central axis of the additional smoothing roller, and
  an additional support driving motor configured to drive in rotation the additional roller support about the respective support rotation axis so as to orient the additional smoothing roller in a selected orientation.

According to an embodiment of the present disclosure, the three-dimensional printing head includes a displacement device configured to displace the extrusion nozzle with respect to the support surface. Advantageously, the displacement device is configured to displace the extrusion nozzle according to Cartesian displacements.

According to an embodiment of the present disclosure, the three-dimensional printing head includes a torque sensor configured to detect to a rotational torque applied to the mixing rotor. Based on the detected rotational torque, it is possible to measure the consistency of the building material mixed within the mixing chamber and to regulate the control parameters for controlling the three-dimensional printing head.

According to an embodiment of the present disclosure, the three-dimensional printing head includes a pressure sensor configured to detect the pressure at the discharge outlet of the dynamic mixer. Based on the detected pressure, it is possible to obtain an indication of the consistency of the building material mixed within the mixing chamber and to regulate the control parameters for controlling the three-dimensional printing head.

According to an embodiment of the present disclosure, the three-dimensional printing head includes a temperature sensor configured to detect the temperature of the building material at the discharge outlet of the dynamic mixer. Based on the detected temperature, it is possible to obtain an indication of the reaction between the mineral composition and the at least one building material admixture and to regulate the control parameters for controlling the three-dimensional printing head.

According to an embodiment of the present disclosure, the mineral composition is a non-activated mineral composition. In the present specification, the term "non-activated mineral composition" means any mineral composition which has not yet reacted with the at least one building material admixture and which can be used, after adding water, as ink in three-dimensional printing. Particularly, the setting and/or the hardening of a binder contained in the non-activated mineral composition may be activated by the at least one building material admixture or the setting of such a binder may be accelerated by the at least one building material admixture.

According to an embodiment of the present disclosure, the mineral composition is a cementitious composition.

In the present specification, the term "cementitious composition" means any composition of cement, mortar or concrete which can be used, after adding water, as ink in three-dimensional printing.

BRIEF DESCRIPTION OF THE DRAWINGS

The following detailed description of one embodiment of the present disclosure is better understood when read in conjunction with the appended drawings being understood, however, that the present disclosure is not limited to the specific embodiment disclosed.

DETAILED DESCRIPTION

FIGS. 1 to 10 show a three-dimensional printing head 2 for printing a three-dimensional structure from a building material and particularly from a cementitious building material.

The three-dimensional printing head 2 includes a dynamic mixer 3 comprising a mixer casing 4 delimiting a mixing chamber 5. The mixer casing 4 extends along a longitudinal axis A which is substantially horizontal. Advantageously, the mixer casing 4 has a globally cylindrical tubular shape and has a circular cross-section. The mixer casing 4 includes a first open end 4.1 and a second open end 4.2.

The dynamic mixer 3 further includes a mixing rotor 6 rotatably mounted within the mixing chamber 5, and a mixer driving unit 7 configured to drive in rotation the mixing rotor 6 around an extension axis of the mixing rotor 6. The extension axis of the mixing rotor 6 is substantially horizontal and extends substantially coaxially with the longitudinal axis A of the mixer casing 4. Advantageously, the mixing rotor 6 may be removably mounted within the mixer casing 4.

The mixing rotor 6 particularly includes a mixing shaft 8 and mixing members 9 distributed along the mixing shaft 8. The mixing members 9 extend radially outwardly with respect to the extension axis of the mixing rotor 6 and from an outer surface of the mixing shaft 8.

According to the embodiment shown on the figures, the mixer casing 4 includes (see FIGS. 2, 6 and 7) a first casing part 11 and a second casing part 12 which delimit the mixing chamber 5 and which are distinct from each other. Advantageously, the first casing part 11 forms a first half casing and the second casing part 12 forms a second half casing. Therefore, each of the first and second casing parts 11, 12 has a globally semi-cylindrical tubular shape.

Figure 6:
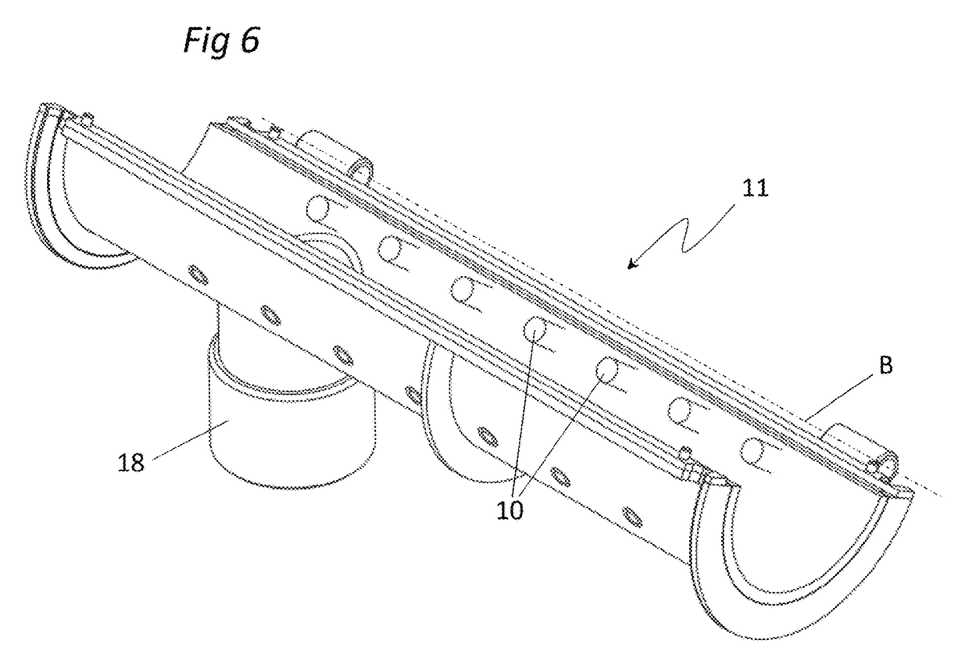
FIG. 6 is a perspective view of a first casing part of a dynamic mixer of the three-dimensional printing head of FIG. 1.
Figure 7:
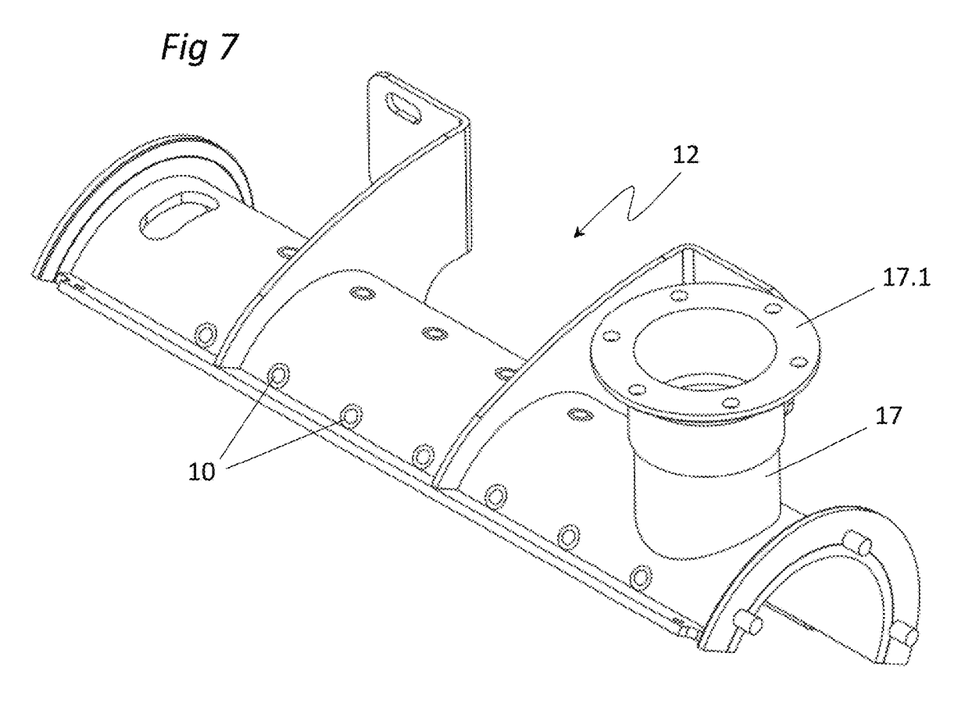
FIG. 7 is a perspective view of a second casing part of the dynamic mixer.

Each of the first and second casing parts 11, 12 may include mixing elements 10 which extend radially inwardly with respect to the extension axis of the mixing rotor 6. The mixing elements 10 are axially shifted with respect to the mixing members 9 provided on the mixing shaft 8.

According to the embodiment shown on the figures, the second casing part 12 is hingedly mounted on the first casing part 11 about a hinge axis B, which is substantially parallel to the longitudinal axis A of the mixer casing 4, and between a closed position in which the first and second casing parts 11, 12 delimit the mixing chamber 5, and an open position in which the first and second casing parts 11, 12 allow a removal of the mixing rotor 6 out of the mixing chamber 5. Advantageously, the hinge axis B extends close to first longitudinal edges of the first and second casing parts 11, 12, and the mixer casing 4 is configured such that, in the closed position, second longitudinal edges of the first and second casing parts 11, 12 are close to or in contact with each other, and such that, in the open position, the second longitudinal edges of the first and second casing parts 11, 12 are distant from each other.

The dynamic mixer 3 further includes a blocking device 13 configured to reversibly block the first and second casing parts 11, 12 in the closed position. According to the embodiment shown on the figures, the blocking device 13 includes a first attachment member 13.1, such as a clamping collar, configured to removably attach first end portions of the first and second casing parts 11, 12 with respect to each other, and a second attachment member 13.2, such as a clamping collar, configured to removably attach second end portions of the first and second casing parts 11, 12 with respect to each other.

The dynamic mixer 3 further includes a first closing member 14.1 and a second closing member 14.2, such as a first and second closing covers, configured to respectively close the first and second open ends 4.1, 4.2 of the mixer casing 4. Advantageously, the first and second closing members 14.1, 14.2 are configured to rotatably support first and second end portions of the mixing rotor 6. According to the embodiment shown on the figures, the mixer driving unit 7 includes a driving shaft 7.1 extending through the second closing member 14.2 and rotatably coupled to the mixing rotor 6.

The dynamic mixer 3 further includes a supply inlet 15 provided on the mixer casing 4 and emerging in the mixing chamber 5, and a discharge outlet 16 provided on the mixer casing 4 and emerging in the mixing chamber 5. The supply inlet 15 is configured to supply the mixing chamber 5 with a mineral composition, and particularly a cementitious composition, while the discharge outlet 16 is configured to discharge a cementitious building material produced in the mixing chamber 5. Advantageously, the supply inlet 15 is located in an upper part of the mixer casing 4 and close to a first end of the mixing chamber 5, and the discharge outlet 16 is located in a lower part of the mixer casing 4 and close to a second end of the mixing chamber 5.

The dynamic mixer 3 further includes a tubular supply member 17 secured to the mixer casing 4 and fluidly connected to the supply inlet 15, and a tubular discharge member 18 secured to the mixer casing 4 and fluidly connected to the discharge outlet 16. Advantageously, each of the tubular supply member 17 and the tubular discharge member 18 extends radially with respect to the longitudinal axis A of the mixer casing 4.

The dynamic mixer 3 further comprises an injector 19 for injecting a building material admixture, for example a concrete admixture, in the mixing chamber 5. The building material admixture is configured to modify physical properties of the cementitious composition, such as its rheology, its surface-active force, its plasticity, its stability, its thixotropy, etc. Advantageously, the building material admixture includes a hardening accelerator and/or a setting trigger.

The dynamic mixer 3 is particularly configured to mix the cementitious composition and the building material admixture contained in the mixing chamber 5 in order to produce the cementitious building material.

Figure 4:
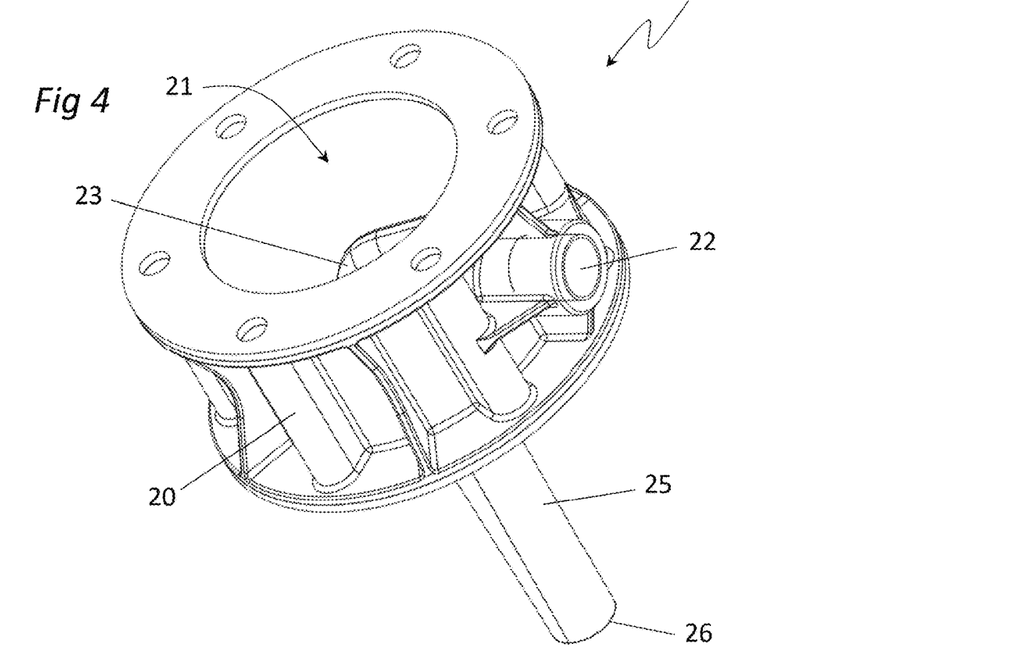
FIG. 4 is a perspective view of an injector of the three-dimensional printing head of FIG. 1.
Figure 5:
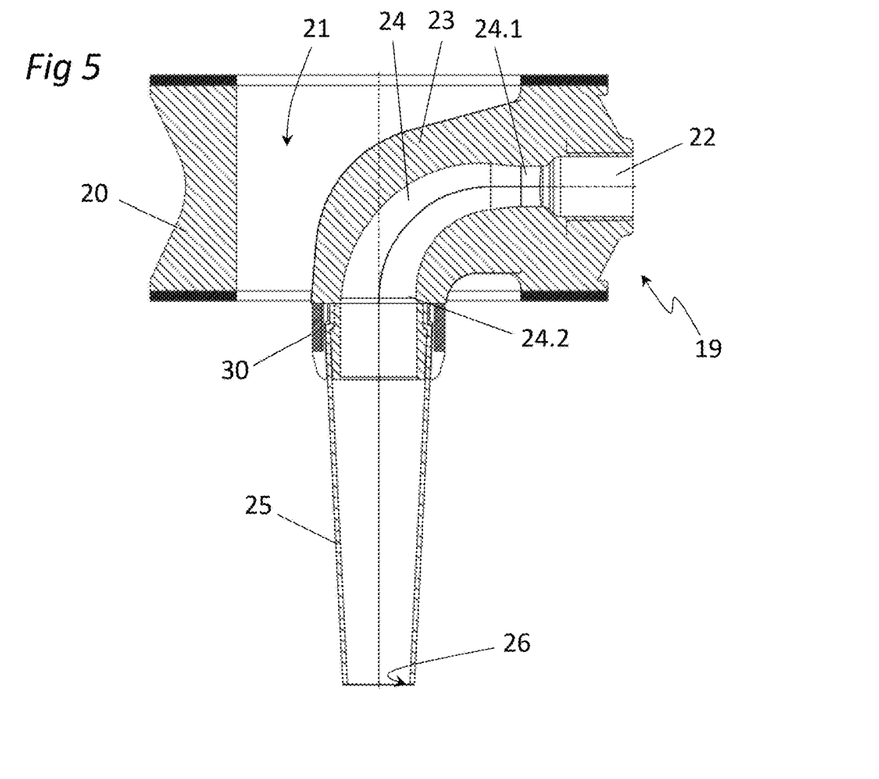
FIG. 5 is a longitudinal cross-section view of the injector of FIG. 4.

As better shown on FIGS. 4 and 5, the injector 19 includes a mounting sleeve 20 which is secured to an annular flange 17.1 of the tubular supply member 17 and which extends coaxially with the tubular supply member 17. The mounting sleeve 20 includes an axial flow passage 21 fluidly connected to the tubular supply member 17.

The mounting sleeve 20 further includes an inlet opening 22 emerging in an outer peripheral surface of the mounting sleeve 20 and extending radially with respect to a central axis of the mounting sleeve 20.

The injector 19 further includes a connecting part 23 which extends from an inner peripheral surface of the mounting sleeve 20 and which is at least partially arranged in the axial flow passage 21 of the mounting sleeve 20. Advantageously, the mounting sleeve 20 and the connecting part 23 are made in one piece.

The connecting part 23 includes a connection channel 24 having a first channel end 24.1 fluidly connected to the inlet opening 22 and a second channel end 24.2 extending axially with respect to the central axis of the mounting sleeve 20. Advantageously, each of the connecting part 23 and the connection channel 24 is bent.

The injector 19 further includes a tubular injecting member 25 which is flexible and which is secured to the connecting part 23, for example using a securing ring 30 or any other securing means. Advantageously, the tubular injecting member 25 extends within the tubular supply member 17 and coaxially with the tubular supply member 17.

The tubular injecting member 25 forms an injection nozzle and has an injection outlet 26. The injection outlet 26 is facing the supply inlet 15 and emerges in the tubular supply member 17 close to the supply inlet 15. The tubular injecting member 25 may have a frustoconical shape, and may thus have a cross section which decreases towards the injection outlet 26.

The tubular injecting member 25 is elastically deformable between a first state, also named injection state, in which the tubular injecting member 25 is configured to allow a flow of the building material admixture through the tubular injecting member 25 and towards the injection outlet 26, and a second state, also named flow blocking state, in which the tubular injecting member 25 is configured to prevent a flow of the building material admixture and the cementitious composition from the mixing chamber 5 and through the tubular injecting member 25. The tubular injecting member 25 particularly form a passive check valve. The first state of the tubular injecting member 25 may correspond to a rest state of the tubular injecting member 25.

Advantageously, the tubular injecting member 25 is configured to be deformed in the second state by the cementitious composition supplied to the mixing chamber 5 and flowing through the tubular supply member 17, and is configured to be deformed in the first state by the building material admixture supplied to the injector 19 and flowing through the tubular injecting member 25. According to an embodiment of the present disclosure, the tubular injecting member 25 is configured such that, in the first state, the injection outlet 26 of the tubular injecting member 25 is open, and such that, in the second state, the injection outlet 26 of the tubular injecting member 25 is closed.

According to the embodiment shown on the figures, the injector 19 further includes a Y-shaped coupling 27 having an outlet pathway 27.1 fluidly connected to the inlet opening 22 of the mounting sleeve 20, and first and second inlet pathways 27.2, 27.3 configured to be respectively fluidly connected to a cleaning water source and to a building material admixture source. Cleaning water is particularly injected in the mixing chamber 5 via the first inlet pathway 27.2 in order to clean the mixing chamber.

Advantageously, a three-way coupling, for example a T-shaped coupling, is located upstream of the second inlet pathway 27.3, said three-way coupling having an outlet pathway fluidly connected to the second inlet pathway 27.3 of the Y-shaped coupling 27, and first and second inlet pathways configured to be respectively fluidly connected to a water source and to the building material admixture source so as to allow a mixture of water and building material admixture within the three-way coupling. The injector 19 is therefore configured to inject a mixture of water and of building material admixture in the mixing chamber 5.

The three-dimensional printing head 2 also includes a tubular connecting member 28 secured to the mounting sleeve 20 and configured to be fluidly connected to a cementitious composition source. The mounting sleeve 20 is therefore interposed, i.e. sandwiched, between the tubular supply member 17 and the tubular connecting member 28. Advantageously, the tubular supply member 17, the mounting sleeve 20 and tubular connecting member 28 form a tubular supply duct.

Figure 1:
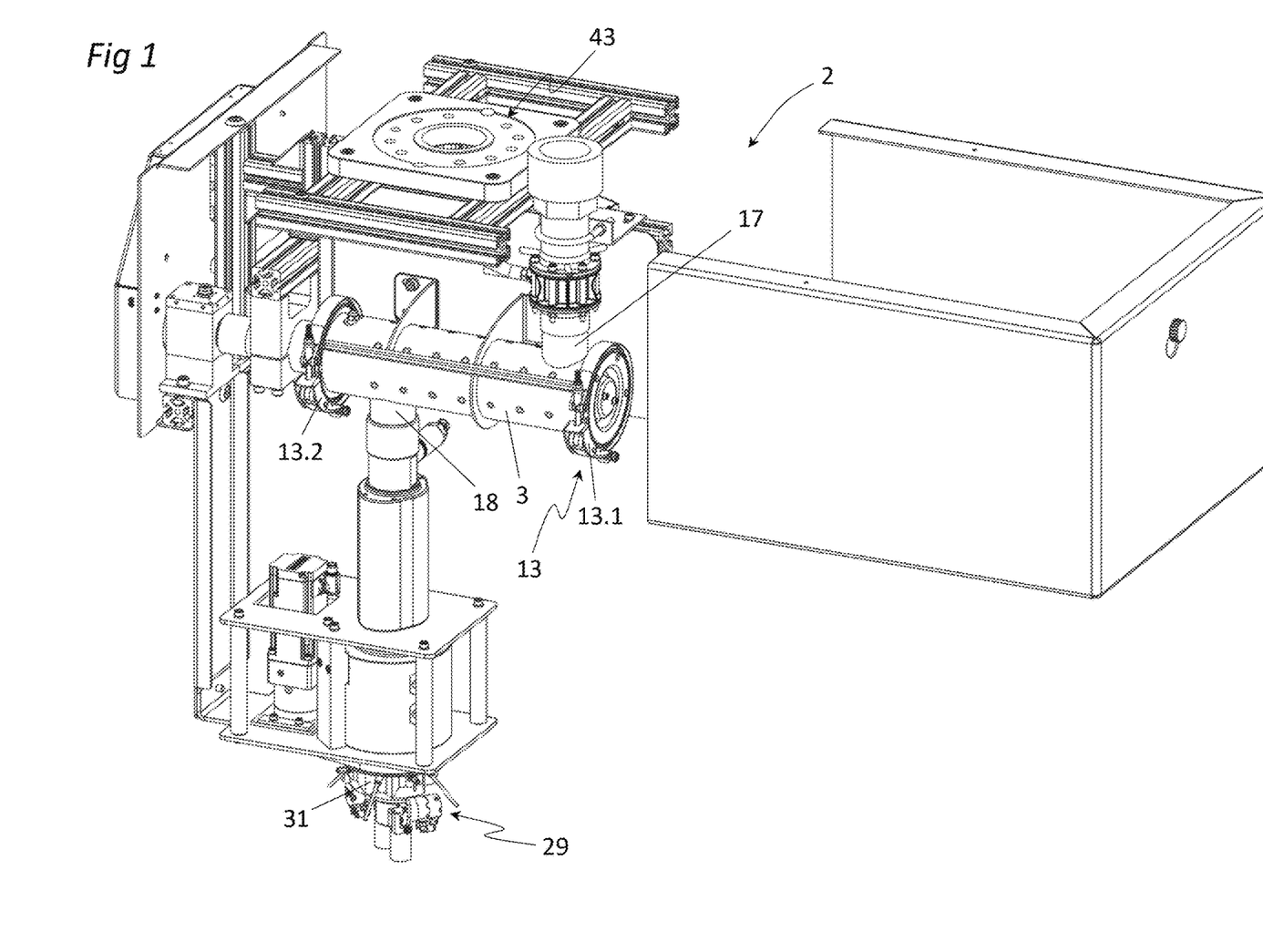
FIG. 1 is a perspective view, partially exploded, of a three-dimensional printing head according to the present disclosure.
Figure 2:
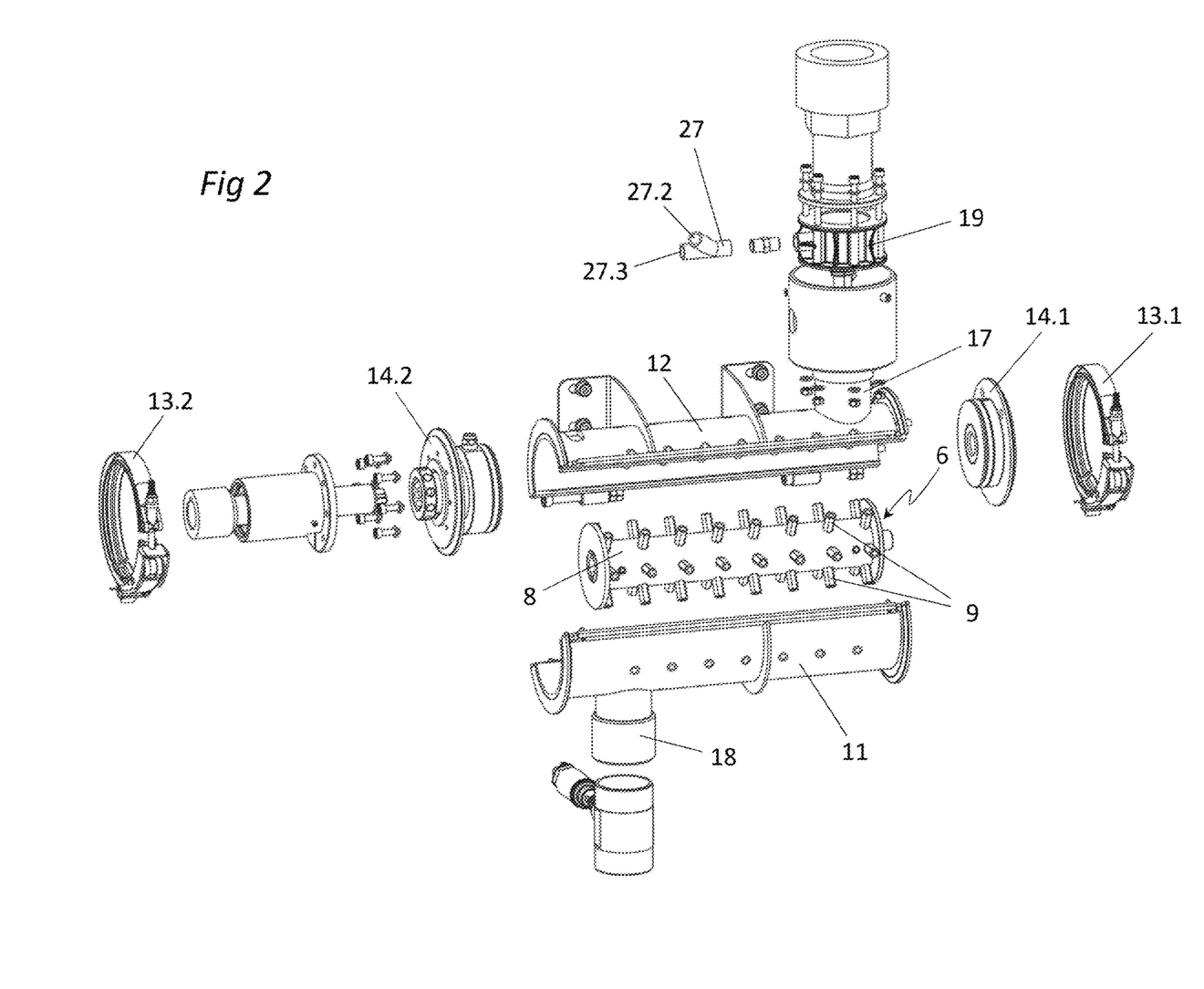
FIG. 2 is a partial exploded perspective view of the three-dimensional printing head of FIG. 1.
Figure 3:
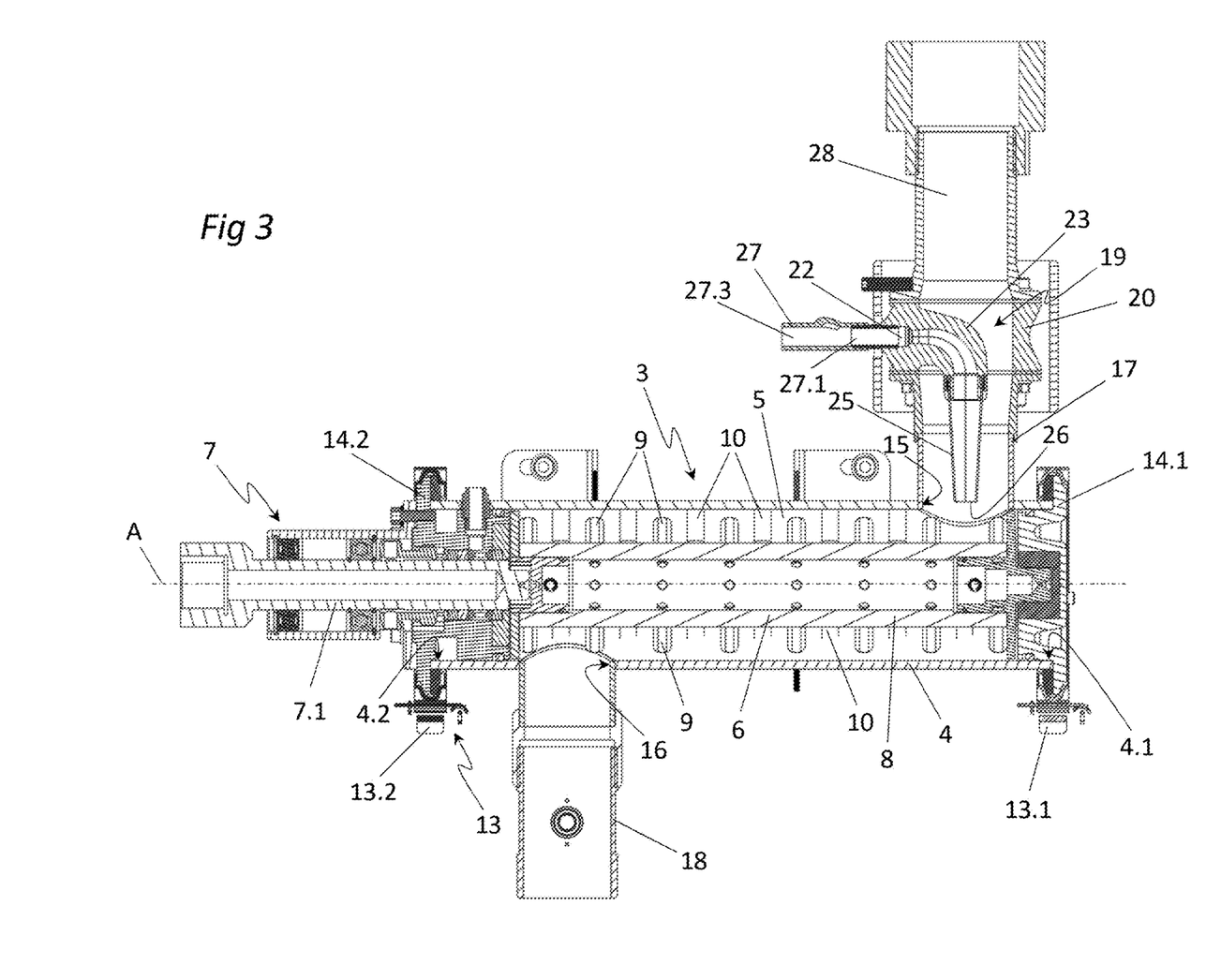
FIG. 3 is a partial longitudinal cross-section view of the three-dimensional printing head of FIG. 1.
Figure 8:
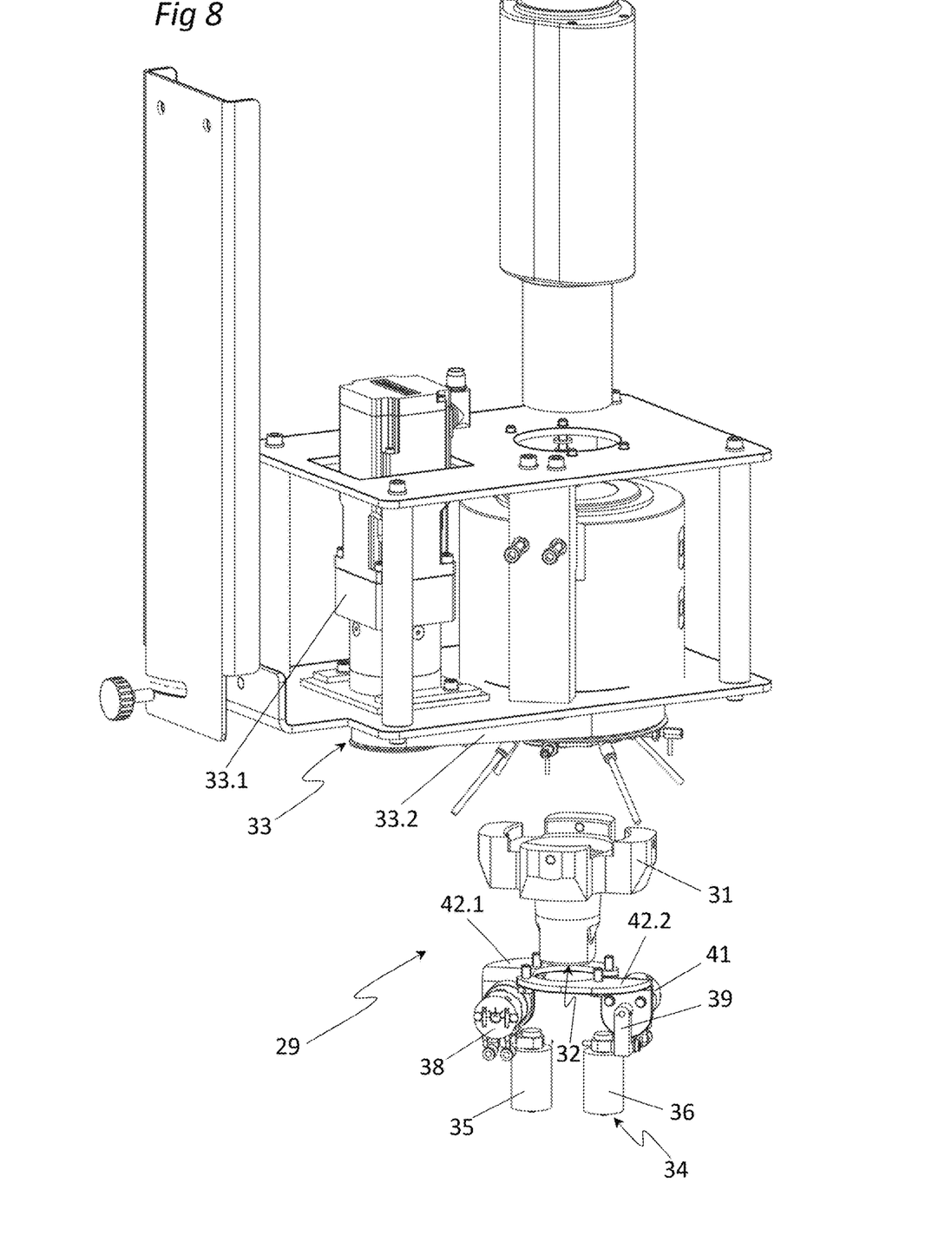
FIG. 8 is an exploded perspective view of an extruding nozzle of the three-dimensional printing head of FIG. 1.
Figure 9:
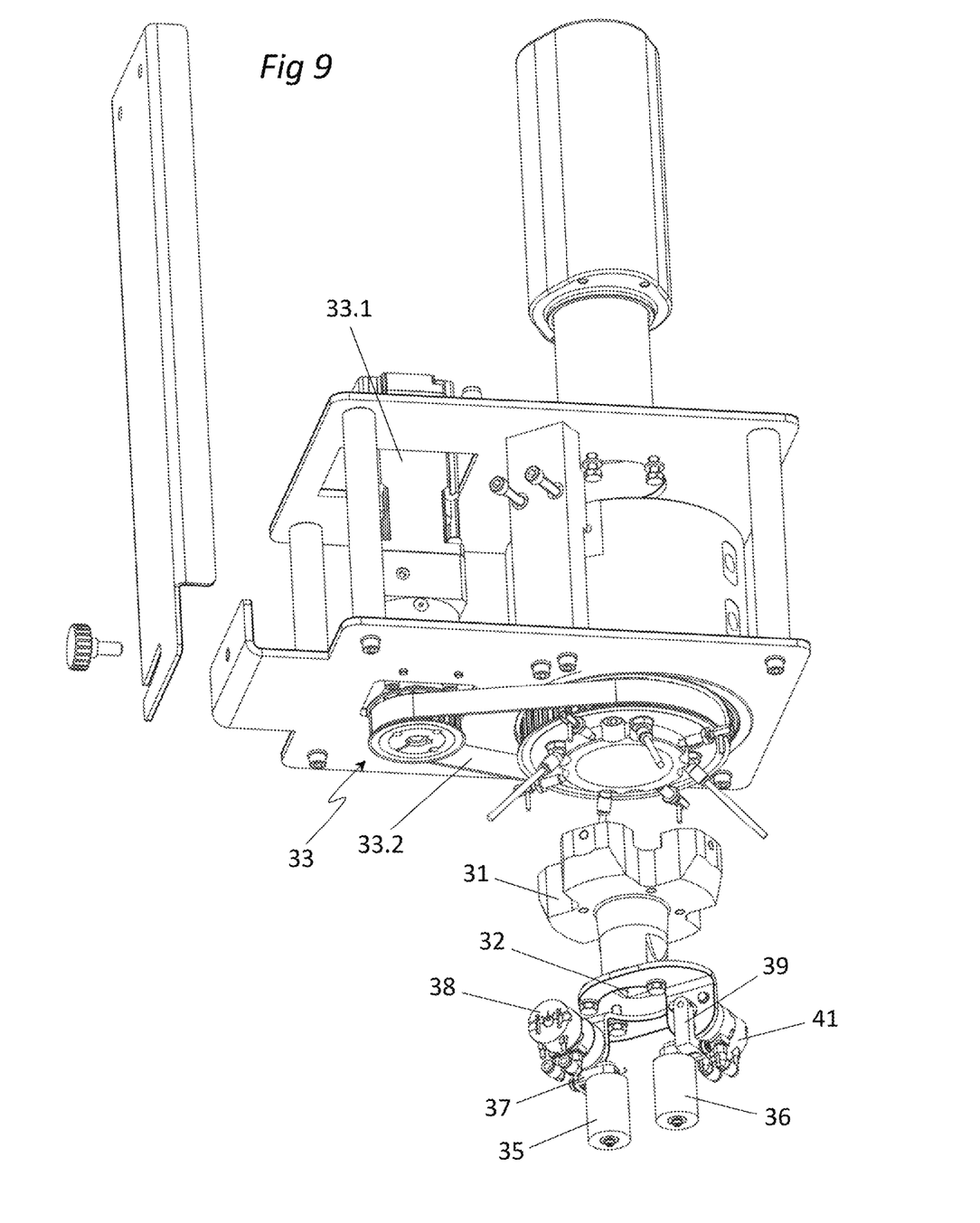
FIG. 9 is an exploded perspective view of the extruding nozzle of FIG. 8.
Figure 10:
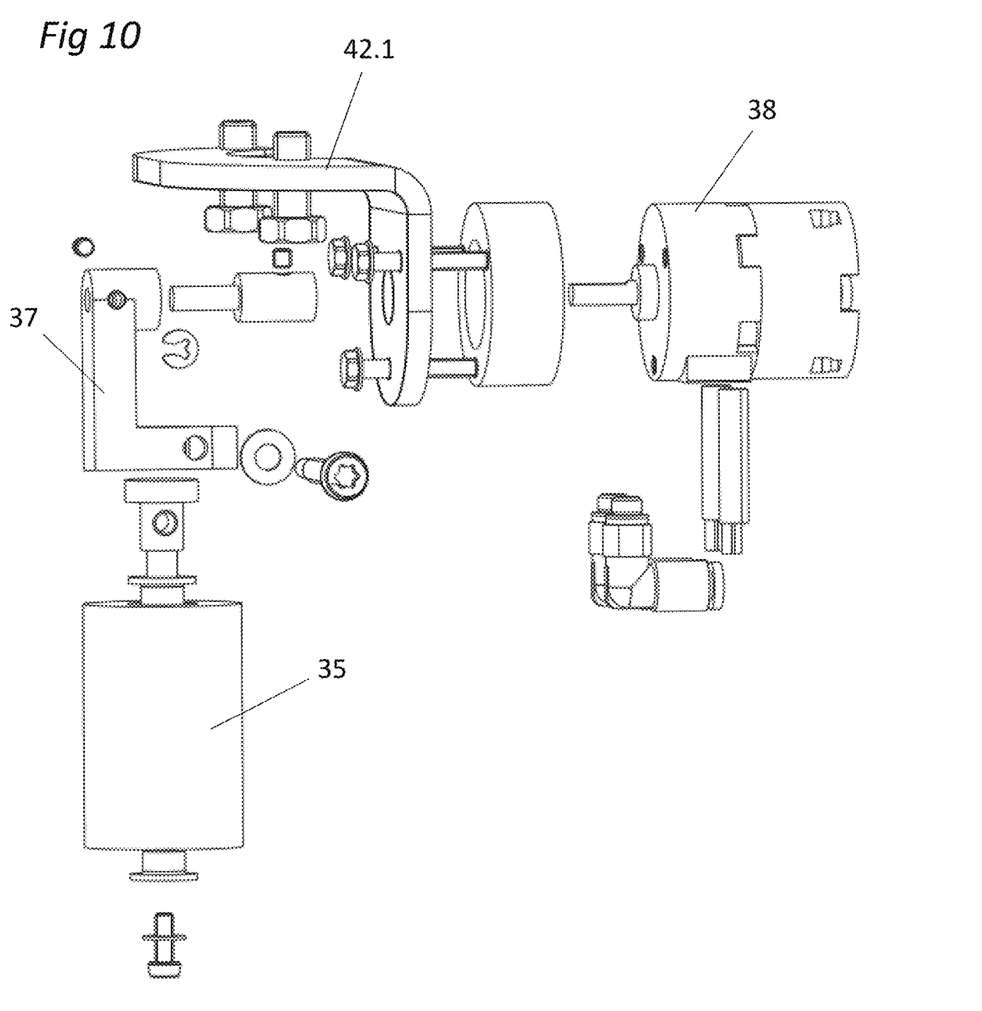
FIG. 10 is a partial exploded perspective view of a smoothing device of the extruding nozzle of FIG. 8.

As better shown on FIGS. 1 and 8, the three-dimensional printing head 2 further includes an extrusion nozzle 29 which is fluidly connected to the discharge outlet 16 of the dynamic mixer 3 and which is configured to extrude layers of cementitious building material on a support surface.

The extrusion nozzle 29 includes a nozzle body 31 provided with an extrusion outlet 32 which is downwardly oriented. The nozzle body 31 is particularly rotatable about a rotation axis which is substantially vertical. Advantageously, the three-dimensional printing head 2 includes a nozzle driving unit 33 configured to drive in rotation the nozzle body 31 around the rotation axis. The nozzle driving unit 33 may for example include a nozzle driving motor 33.1 and a transmission belt 33.2 coupled to the driving motor 33.1 and to the nozzle body 31.

According to the embodiment shown on the figures, the extrusion nozzle 29 further includes a smoothing device 34 (see FIG. 8) configured to smooth outer surfaces of the extruded layers. Advantageously, the smoothing device 34 includes a smoothing roller 35 and an additional smoothing roller 36 which are disposed on either side of the extrusion outlet 32 and which are located close to the extrusion outlet 32. Each of the smoothing roller 35 and the additional smoothing roller 36 has a central axis and is freely rotatable around its central axis.

The extrusion nozzle 29 further includes:
 a roller support 37 on which is freely rotatably mounted the smoothing roller 35, the roller support 37 being rotatable with respect to the nozzle body 31 about a support rotation axis which is substantially horizontal and which is substantially perpendicular to the central axis of the smoothing roller 35, a support driving motor 38 configured to drive in rotation the roller support 37 about its support rotation axis so as to orient the smoothing roller 35 in a selected orientation, the support driving motor 38 being configured to displace the smoothing roller 35 in a vertical displacement plane, an additional roller support 39 on which is freely rotatably mounted the additional smoothing roller 36, the additional roller support 39 being rotatable with respect to the nozzle body 31 about a support rotation axis which is substantially horizontal and which is substantially perpendicular to the central axis of the additional smoothing roller 36, and an additional support driving motor 41 configured to drive in rotation the additional roller support 39 about its support rotation axis so as to orient the additional smoothing roller 36 in a selected orientation, the additional support driving motor 41 being configured to displace the additional smoothing roller 36 in a vertical displacement plane.

Advantageously, the smoothing roller 35 is displaceable between a smoothing orientation in which the central axis of the smoothing roller 35 is substantially parallel to an outlet orientation of the extrusion outlet 32, and an inactive orientation in which the central axis of the smoothing roller 35 is inclined relative to the outlet orientation of the extrusion outlet 32. Similarly, the additional smoothing roller 36 is displaceable between a smoothing orientation in which the central axis of the additional smoothing roller 36 is substantially parallel to the outlet orientation of the extrusion outlet 32, and an inactive orientation in which the central axis of the additional smoothing roller 36 is inclined relative to the outlet orientation of the extrusion outlet 32.

The extrusion nozzle 29 further includes a support members 42.1 and an additional support member 42.2 which are secured to the nozzle body 31 and on which is respectively rotatably mounted the roller support 37 and the additional roller support 39. However, the extrusion nozzle 29 may include a common support member which is secured to the nozzle body 31 and on which is rotatably mounted the roller support 37 and the additional roller support 39.

The three-dimensional printing head 2 also includes a displacement device 43 configured to displace the extrusion nozzle 29 with respect to the support surface. Advantageously, the displacement device 43 is configured to displace the extrusion nozzle 29 according to Cartesian displacements, i.e. to displace in translation the extrusion nozzle 29 along the X-direction, the Y-direction and the Z-direction.

Additionally, the three-dimensional printing head 2 may include:

a torque sensor configured to detect to a rotational torque applied to the mixing rotor 6, a pressure sensor configured to detect the pressure at the discharge outlet 16 of the dynamic mixer 3, a temperature sensor configured to detect the temperature of the cementitious building material at the discharge outlet 16 of the dynamic mixer 3.

Advantageously, control parameters for controlling the three-dimensional printing head 2 are regulated based notably on the detected temperature, the detected pressure and the detected torque.

Of course, the present disclosure is not restricted to the embodiment described above by way of non-limiting example, but on the contrary it encompasses all embodiments thereof.

The invention claimed is:

1. A three-dimensional printing head for printing a three-dimensional structure from a building material, comprising:

a dynamic mixer comprising a mixer casing delimiting a mixing chamber, the dynamic mixer further comprising a supply inlet emerging in the mixing chamber and configured to supply the mixing chamber with a mineral composition, and a discharge outlet emerging in the mixing chamber, an injector for injecting at least one building material admixture in the mixing chamber, the dynamic mixer being configured to mix the mineral composition and the at least one building material admixture contained in the mixing chamber in order to produce the building material, wherein the injector includes a tubular injecting member being flexible and having an injection outlet, the tubular injecting member being elastically deformable between at least a first state in which the tubular injecting member is configured to allow a flow of the at least one building material admixture through the tubular injecting member and towards the injection outlet, and a second state in which the tubular injecting member is configured to prevent a flow of the at least one building material admixture and/or of the mineral composition from the mixing chamber and through the tubular injecting member, and the dynamic mixer includes a tubular supply member secured to the mixer casing and fluidly connected to the supply inlet, the tubular injecting member extending at least partially within the tubular supply member.

2. The three-dimensional printing head according to claim 1, wherein the tubular injecting member is elastically deformed in the second state by the mineral composition supplied to the mixing chamber and flowing through the tubular supply member.

3. The three-dimensional printing head according to claim 1, wherein the injection outlet of the tubular injecting member is facing the supply inlet.

4. The three-dimensional printing head according to claim 1, wherein the tubular injecting member extends coaxially with the tubular supply member.

5. The three-dimensional printing head according to claim 1, wherein the injector includes a mounting sleeve which is secured to the tubular supply member and which includes an axial flow passage fluidly connected to the tubular supply member.

6. The three-dimensional printing head according to claim 5, wherein the mounting sleeve includes an inlet opening emerging in an outer peripheral surface of the mounting sleeve, the injector further including a connecting part to which is secured the tubular injecting member, the connecting part being at least partially arranged in the axial flow passage of the mounting sleeve and including a connection channel fluidly connecting the inlet opening to the tubular injecting member.

7. The three-dimensional printing head according to claim 1, wherein the dynamic mixer includes a mixing rotor rotatably mounted within the mixing chamber, the mixing rotor extending along an extension axis which is horizontal.

8. The three-dimensional printing head according to claim 7, wherein the mixing rotor includes a mixing shaft and mixing members distributed along the mixing shaft and extending substantially radially with respect to the extension axis of the mixing rotor.

9. The three-dimensional printing head according to claim 7, wherein the mixer casing has a first casing part and a second casing part which delimit the mixing chamber and which are distinct from each other, the first and second casing parts being movably mounted with respect to each other between a closed position in which the first and second casing parts delimit the mixing chamber, and an open position in which the first and second casing parts allow a removal of the mixing rotor out of the mixing chamber.

10. The three-dimensional printing head according to claim 9, wherein the dynamic mixer includes a blocking device configured to reversibly block the first and second casing parts in the closed position.

11. The three-dimensional printing head according to claim 9, further including a securing device that includes a first fixing member configured to removably secure first end portions of the first and second casing parts with respect to each other and a second fixing member configured to removably secure second end portions of the first and second casing parts with respect to each other.

12. The three-dimensional printing head according to claim 1, wherein the at least one building material admixture includes a hardening accelerator.

13. The three-dimensional printing head according to claim 1, further including an extrusion nozzle which is fluidly connected to the discharge outlet of the dynamic mixer and which is configured to extrude layers of building material on a support surface.

14. The three-dimensional printing head according to claim 13, wherein the extrusion nozzle includes a nozzle body provided with an extrusion outlet and being rotatable around a rotation axis which is substantially vertical.

15. The three-dimensional printing head according to claim 13, wherein the extrusion nozzle includes a smoothing device configured to smooth outer surfaces of the extruded layers of building material.

16. The three-dimensional printing head according to claim 15, wherein the smoothing device includes a smoothing roller having a central axis and being freely rotatable around its central axis.

17. The three-dimensional printing head according to claim 1,
further including an extrusion nozzle which is fluidly connected to the discharge outlet of the dynamic mixer and which is configured to extrude layers of building material on a support surface, wherein the extrusion nozzle includes:
a smoothing device configured to smooth outer surfaces of the extruded layers of building material, the smoothing device includes a smoothing roller having a central axis and being freely rotatable around its central axis:
a nozzle body provided with an extrusion outlet and being rotatable around a rotation axis which is substantially vertical; and
a roller support on which is freely rotatably mounted the smoothing roller, the roller support being rotatable with respect to the nozzle body about a support rotation axis which is substantially horizontal and which is substantially perpendicular to the central axis of the smoothing roller, and
a support driving motor configured to drive in rotation the roller support about the support rotation axis so as to orient the smoothing roller in a selected orientation.

18. The three-dimensional printing head according to claim 1, wherein the mineral composition is a cementitious composition.

19. The three-dimensional printing head according to claim 2, wherein the tubular injecting member extends coaxially with the tubular supply member.

* * * * *